United States Patent
Li et al.

(10) Patent No.: US 11,301,775 B2
(45) Date of Patent: Apr. 12, 2022

(54) DATA ANNOTATION METHOD AND APPARATUS FOR ENHANCED MACHINE LEARNING

(71) Applicant: CloudMinds Robotics Co., Ltd., Santa Clara, CA (US)

(72) Inventors: Qiang Li, Santa Clara, CA (US); Silvio Savarese, Santa Clara, CA (US); Charles Robert Jankowski, Jr., Santa Clara, CA (US); William Xiao-Qing Huang, Santa Clara, CA (US); Zhe Zhang, Santa Clara, CA (US); Xiaoli Fern, Santa Clara, CA (US)

(73) Assignee: CloudMinds Robotics Co., Ltd., Shanghai (CN)

( * ) Notice: Subject to any disclaimer, the term of this patent is extended or adjusted under 35 U.S.C. 154(b) by 1225 days.

(21) Appl. No.: 15/685,854

(22) Filed: Aug. 24, 2017

(65) Prior Publication Data

US 2018/0060757 A1 Mar. 1, 2018

Related U.S. Application Data

(60) Provisional application No. 62/380,482, filed on Aug. 29, 2016.

(51) Int. Cl.
| | |
|---|---|
| *G06N 3/04* | (2006.01) |
| *G06N 3/08* | (2006.01) |
| *G06N 20/00* | (2019.01) |
| *G06F 3/01* | (2006.01) |
| *G06K 9/62* | (2022.01) |

(52) U.S. Cl.
CPC ............. *G06N 20/00* (2019.01); *G06F 3/016* (2013.01); *G06K 9/6256* (2013.01); *G06F 3/013* (2013.01); *G06N 3/0454* (2013.01)

(58) Field of Classification Search
CPC ........ G06N 20/00; G06N 3/0454; G06N 3/08; G06N 3/12; G06N 3/123; G06K 9/6256; G06F 3/016; G06F 3/013
See application file for complete search history.

(56) References Cited

U.S. PATENT DOCUMENTS

2008/0253625 A1* 10/2008 Schuckers .......... G06K 9/00107
 382/125
2017/0162072 A1* 6/2017 Horseman ............ A61B 5/0205

* cited by examiner

*Primary Examiner* — Hal Schnee
(74) *Attorney, Agent, or Firm* — McCoy Russell LLP

(57) ABSTRACT

A data annotation apparatus for machine learning is provided, which includes a stimulus generation portion, a biometrics reading portion, and a data integration portion. The stimulus generation portion is configured to generate, and present to an agent, at least one stimulus based on a first data from a first machine learning dataset. The biometrics reading portion is configured to measure at least one response of the agent to the at least one stimulus, and to generate biometrics data based on the at least one response. The data integration portion is configured to integrate the biometrics data, data of the at least one stimulus, and data of the first machine learning dataset to thereby obtain a second machine learning dataset. The data annotation apparatus can result in an improved data labeling and an enhanced machine learning.

15 Claims, 13 Drawing Sheets

DATA ANNOTATION METHOD AND APPARATUS FOR ENHANCED MACHINE LEARNING

CROSS-REFERENCE TO RELATED APPLICATION

The present application claims priority to U.S. Patent Application No. 62/380,482 filed on Aug. 29, 2016, whose disclosure is hereby incorporated by reference in its entirety.

TECHNICAL FIELD

The present disclosure relates generally to the field of artificial intelligence, more specifically to machine learning, and in more particular to a machine learning data annotation apparatus, an artificial intelligence machine learning assembly, and a method for enhanced machine learning.

BACKGROUND

As a quickly burgeoning field, machine learning has become a crucial type of artificial intelligence, and has equipped computers (i.e., machines) with a capability of learning without being explicitly programmed.

The last decade has witnessed a significant development of the artificial intelligence machine learning, which has become widely employed for more and more real life applications. Thanks to these developments, we now have practical speech and facial recognition, effective web search, spam filtering, social network analysis, market segmentation, fraud detection, risk analysis, and even self-driving cars. As such, it has brought significant benefits and impact to people's day-to-day life, to economy, and to the society as a whole.

SUMMARY OF THE INVENTION

The present disclosure provides a machine learning data annotation apparatus, an artificial intelligence machine learning assembly, and a method for enhanced machine learning.

In a first aspect, the present disclosure provides a data annotation apparatus for machine learning.

The data annotation apparatus includes a stimulus generation portion, a biometrics reading portion, and a data integration portion. The stimulus generation portion is configured to generate, and present to an agent, at least one stimulus based on a first data from a first machine learning dataset. The biometrics reading portion is configured to measure at least one response of the agent to the at least one stimulus, and to generate biometrics data based on the at least one response. The data integration portion is configured to integrate the biometrics data, data of the at least one stimulus, and data of the first machine learning dataset to thereby obtain a second machine learning dataset.

Herein the stimulus generation portion can include a stimulus presenting sub-portion, which is configured to present to the agent the at least one stimulus based on the first data from the first machine learning dataset.

In the data annotation apparatus as described above, the stimulus generation portion can further include a stimulus preparing sub-portion, which is configured to process the first data from the first machine learning dataset to thereby generate at least one stimulus data suitable for presentation by the stimulus presenting sub-portion. Accordingly, the stimulus presenting sub-portion is further configured, based on the at least one stimulus data, to present to the agent the at least one stimulus. Herein each of the at least one stimulus corresponds to one of the at least one stimulus data.

In the data annotation apparatus, the stimulus presenting sub-portion can include at least one stimulus presenting device. Each of the at least one stimulus presenting device can be a visual content displaying device, which is configured to present a visual stimulus; an auditory content displaying device, which is configured to present an auditory stimulus; a haptic content displaying device, which is configured to present a haptic stimulus; an olfactory content displaying device, which is configured to present an olfactory stimulus; or a gustatory content displaying device, which is configured to present a gustatory stimulus.

In some embodiments of the data annotation apparatus, the biometrics reading portion includes a response measuring sub-portion and a biometrics extracting sub-portion. The response measuring sub-portion is configured to measure the at least one response of the agent to the at least one stimulus, and to send data of the at least one response to the biometrics extracting sub-portion, and the biometrics extracting sub-portion is configured to extract the biometrics data based on the data of the at least one response.

Herein the response measuring sub-portion can include at least one biometric response-capturing device. Each of the at least one biometric response-capturing device can be a brain activity measuring device, an eye tracking device, a galvanic skin response (GSR) detecting device, a temperature detecting device, an electrocardiogram (ECG) detecting device, a motion detecting device, a respiration rate detecting device, a facial code detecting device, a pupil dilation detecting device, or a blood pressure detecting device.

According to some embodiments, the at least one biometric response-capture device includes a brain activity measuring device. The brain activity measuring device can be an electroencephalography (EEG) device, a magnetoencephalography (MEG) device, a functional magnetic resonance imaging (fMRI) device, a single-photon emission computed tomography (SPECT) device, a ligand-based positron emission tomography (PET) device, a near infrared spectroscopy (NIRS) device, a diffusion-tensor imaging (DTI) device, a magnetic resonance spectroscopy (MRS) device, a regional cerebral blood flow (rCBF) device, or a transcranial magnetic stimulation (TMS) device.

In some preferred embodiments of the data annotation apparatus, the at least one biometric response-capture device includes at least one of an electroencephalography (EEG) device or an eye tracking device.

In the data annotation apparatus as described above, the stimulus generation portion can be further configured to send a synchronization signal to the biometrics reading portion.

In the data annotation apparatus as described above, the first data can be from at least one of a training set, a validation set, or a testing set, of the first machine learning dataset.

In a second aspect, the present disclosure further provides a machine learning assembly or a machine learning assembly. The machine learning assembly includes a data annotation apparatus according to any of the embodiments as described above.

The machine learning assembly can further include a machine learning apparatus, which is configured to develop a machine learning algorithm based on the second machine learning dataset. Herein the machine learning algorithm can be a linear regression model, a logistic regression model, or an artificial neural network-based model.

In a third aspect, the present disclosure further provides a method for machine learning. The method includes the following two steps:

generating a second machine learning dataset based on a first machine learning dataset, wherein the second machine learning dataset comprises biometrics data based on at least one response of an agent to at least one stimulus generated based on a first machine learning dataset; and developing a machine learning algorithm based on the second machine learning dataset.

According to some embodiments of the method, the step of generating a second machine learning dataset based on a first machine learning dataset includes the following three sub-steps:

generating, and presenting to the agent, the at least one stimulus based on a first data from the first machine learning dataset;

detecting the at least one response of the agent exposed to the at least one stimulus and generating the biometrics data based on the at least one response; and integrating the biometrics data, data of the at least one stimulus, and data of the first machine learning dataset to thereby obtain a second machine learning dataset.

Herein the sub-step of generating, and presenting to the agent, the at least one stimulus based on a first data from the first machine learning dataset can further include:

preparing stimulus data based on the first data from the first machine learning dataset, wherein the stimulus data has a format suitable for presenting; and presenting the stimulus data as the at least one stimulus.

Furthermore, the sub-step of detecting the at least one response of the agent exposed to the at least one stimulus and generating the biometrics data based on the at least one response can further include:

measuring the at least one response of the agent exposed to the at least one stimulus; and extracting the biometrics data based on the at least one response.

In the embodiments of the method as described above, the at least one stimulus can include one, or a combination, of a visual stimulus, an auditory stimulus, a haptic stimulus, an olfactory stimulus, and a gustatory stimulus.

In some preferred embodiments of the method, the at least one stimulus includes at least one of a visual stimulus, an auditory stimulus, or a haptic stimulus.

In the method as disclosed herein, the biometrics data can include at least one of electroencephalography (EEG) data, magnetoencephalography (MEG) data, functional magnetic resonance imaging (fMRI) data, single-photon emission computed tomography (SPECT) data, ligand-based positron emission tomography (PET) data, near infrared spectroscopy (NIRS) data, diffusion-tensor imaging (DTI) data, magnetic resonance spectroscopy (MRS) data, regional cerebral blood flow (rCBF) data, transcranial magnetic stimulation (TMS) data, eye tracking data, skin sweet level data, temperature data, electrocardiogram (ECG) data, motion data, respiration rate data, facial coding data, pupil dilation data, or blood pressure data.

According to some preferred embodiments of the method, the biometrics data includes at least one of electroencephalography (EEG) data and eye tracking data.

BRIEF DESCRIPTION OF DRAWINGS

To more clearly illustrate some of the embodiments disclosed herein, the following is a brief description of drawings. The drawings in the following descriptions are only illustrative of some embodiments. For those of ordinary skill in the art, other drawings of other embodiments can become apparent based on these drawings.

DETAILED DESCRIPTION OF DRAWINGS

Figure 1:
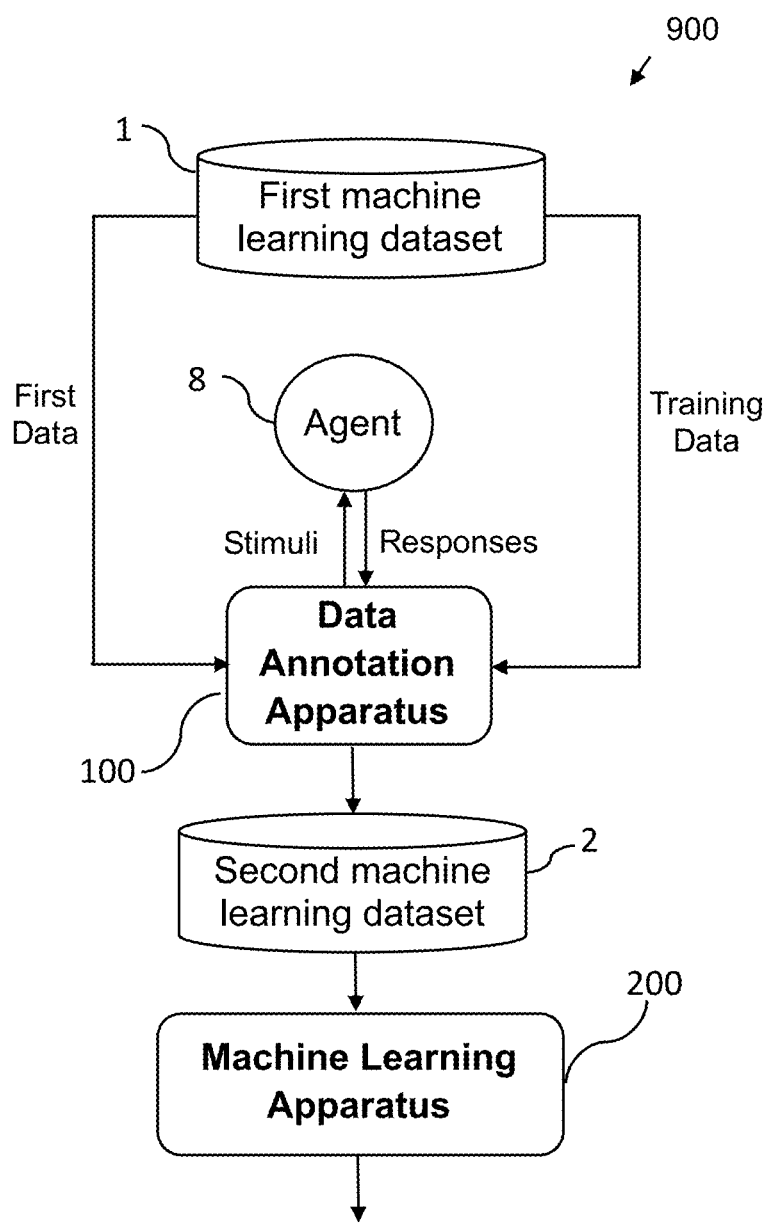
FIG. 1 shows a data annotation apparatus in a machine learning assembly according to some embodiments of the present disclosure.

Machine learning typically involves a development of a prediction model (i.e. machine learning algorithm) by means of a known dataset (i.e., the dataset for a training purpose) before an application thereof in real situations. During the development of the machine learning algorithm, the known dataset is commonly split into a training set and a testing set: whereas the training set is utilized to train the machine learning model in a training phase, the testing set is utilized to test how well the model makes predictions in a testing phase.

Sometimes if more than one prediction algorithms are possible, a third set from the known dataset, termed a validating set, can be additionally utilized to compare the performances of the more than one prediction algorithms that have been created based on the training set before picking of a prediction algorithm having the best performance. Subsequently the testing set is used to test how well the prediction model that has been picked based on the validating set performs in making predictions.

Some machine learning algorithms, such as those in supervised learning and semi-supervised learning, rely on data where a true label or class has been explicitly indicated, and thus their successful implementation depends heavily on accurate classification/labeling/annotation of the data in any, or a combination, of the training set, the testing set, and optionally the validation set, in the whole training-purposed dataset.

In one example, a large set of images of biopsied tissue slices, labelled as "normal" or "cancerous", and additionally labelled as different grades and stages for the "cancerous" class, can be fed into a machine learning system (i.e. the machine), so that the system learns to recognize the cancerous samples and/or determine the grade and stage of the samples. Another set of images of biopsied tissue slices can then be used to test the learnt system so see how accurate the system can recognize and grade the cancerous samples.

In another example, a large set of images of human faces, labeled with races or ethnicities (such as Caucasians, Africans, or Chinese, etc.) of the persons in each of the images. After training, the machine can recognize the race or ethnicity of a human face in the image.

In some artificial intelligence machine learning scenarios such as those described above, data, especially the types of data that involve human sensory or behavioral responses, such as images, videos, audios, smells, tastes, need to be manually annotated or labeled by humans. The annotation/labeling process typically requires trained agents, and typically involves visiting the data, mentally interpreting the data, and labeling them by explicitly entering data into a computer system. As such, the quality of these labelled data, and in turn the effectiveness of artificial intelligence machine learning models based thereupon, is highly dependent on this manual and essentially subjective interpretations.

Given the large volume of data that is typically required for the development of effective prediction models in machine learning, the above task of human-dependent manual annotation is often time consuming and labor intensive, which is further prone to human errors and lack of reproducibility due to the subjective nature. These issues in turn may have accounted for the not so successful, or even failed, development of machine learning systems in some of the artificial intelligence application fields.

In order to address these above issues associated with data labeling in conventional machine learning, the present disclosure provides an apparatus and a method for machine learning, and an enhanced artificial intelligence machine learning assembly/system, which substantially utilizes human biometric responses to controlled stimuli for labeling data and for augmenting the training/validation/testing dataset. It is to utilize, to a certain extent, human brains' natural processing power to enhance machine training and improve the effectiveness of training. Depending on specific cases, the agents involved may or may not need to be trained.

In the following, with reference to the above mentioned drawings of various embodiments disclosed herein, the technical solutions of the various embodiments of the disclosure will be described in a clear and fully understandable way. It is noted that the described embodiments are merely a portion, but not all, of the embodiments of the disclosure. Based on the described embodiments of the disclosure, those ordinarily skilled in the art can obtain other embodiment(s) which shall come within the scope sought for protection by the disclosure.

In a first aspect, the present disclosure provides a data annotation apparatus for machine learning. The data annotation apparatus can incorporate biometric responses from an agent, who is typically a human agent, for an enhanced machine learning.

Specifically as illustrated in FIG. 1, the data annotation apparatus 100 is configured, based on a first data from an available machine learning dataset that is for the training purpose (shown as "first machine learning dataset 1" shown in the figure), to generate, and to present to an agent 8, at least one stimulus (shown as "stimuli" in the figure) that can elicit a sensory or behavioral response in the agent.

The data annotation apparatus 100 is then configured to collect at least one response (shown as "responses" in the figure) from the agent exposed to the at least one stimulus (i.e. "stimuli" in the figure) that has been generated.

The data annotation apparatus 100 is further configured to integrate data of the stimuli that have been generated (i.e. stimulus data), data extracted based on the responses that have been collected (i.e. biometrics data), and data from the first machine learning dataset 1 (shown as "training data" in the figure) to ultimately obtain a second machine learning dataset 2, which can then be fed into a machine learning apparatus 200 to learn a required task.

The biometrics data, if serving a primary labelling purpose, can provide a more reliable annotation means for the data to be labelled than a traditionally manual approach, or if serving a secondary labelling purpose, can offer an additional dimension of data that can cross-validate the data that have been manually labelled. As such, the second machine learning dataset 2 obtained after data integration becomes an enhanced machine learning training dataset.

Figure 2:
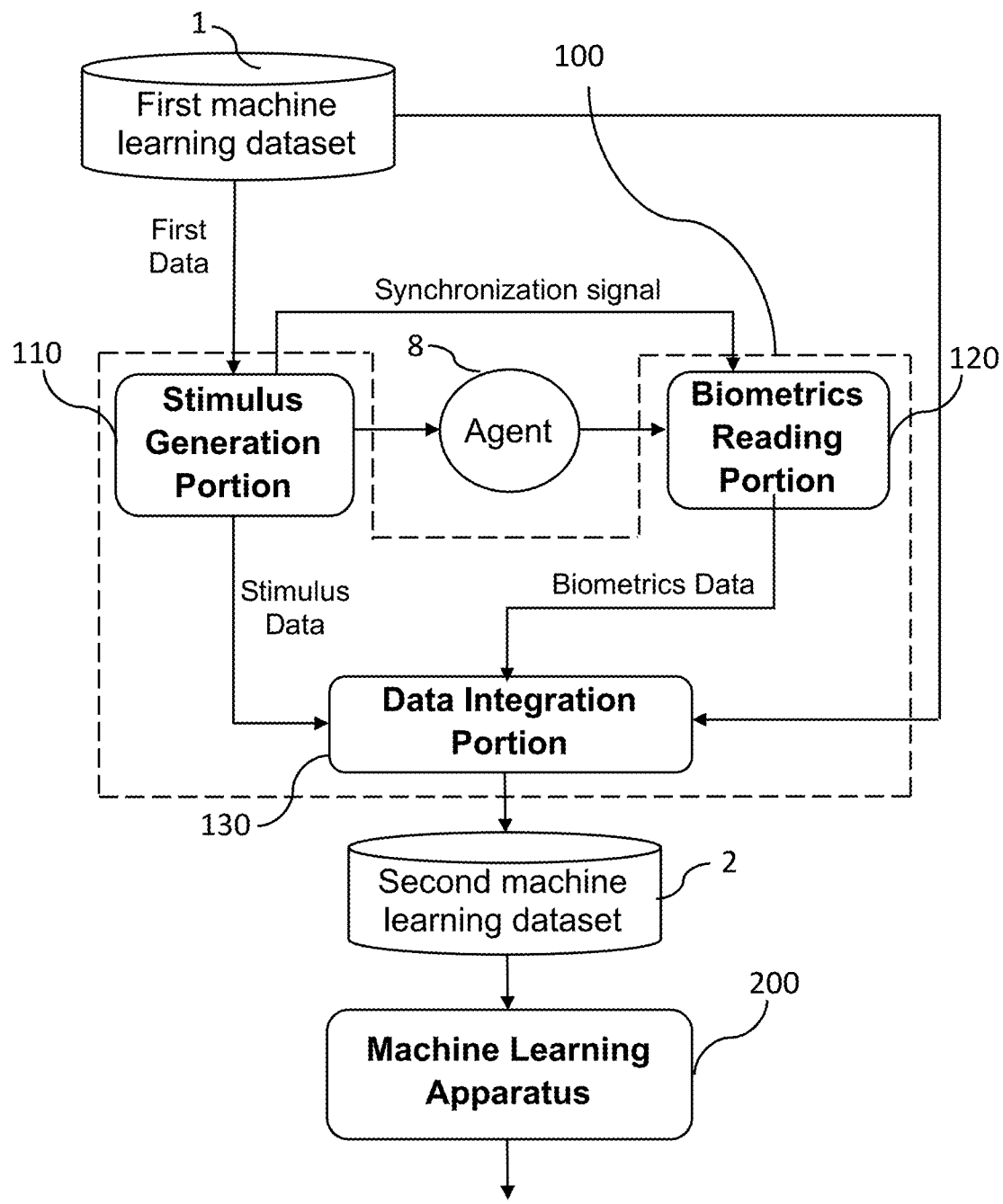
FIG. 2 illustrates a schematic diagram of a specific structure of the data annotation apparatus shown in FIG. 1 according to some embodiments of the present disclosure.

FIG. 2 illustrates a schematic diagram of a specific structure of the data annotation apparatus according to some embodiments of the present disclosure. Specifically, the data annotation apparatus 100 includes a stimulus generation portion 110, a biometrics reading portion 120, and a data integration portion 130, which are indicated by enclosure in a box having dotted lines in FIG. 2.

The stimulus generation portion 110 is configured to generate the at least one stimulus based on the first data from the first machine learning dataset 1, and then to present the at least one stimulus to the agent 8.

The biometrics reading portion 120 is configured to read, measure, detect, or collect the at least one response of the agent 8 to the at least one stimulus generated by the stimuli generation module 110, and to generate the biometrics data based on the at least one response of the agent 8.

The data integration portion 130 is configured to integrate the data of the at least one stimulus generated by the stimulus generation portion 110 (i.e. the stimulus data in the figure), the biometrics data generated by the biometrics reading portion 120, and the data from the first machine learning dataset 1 (i.e. the training data) to thereby obtain the second machine learning dataset 2, which can then be fed to the machine learning apparatus 200 for machine learning.

The following are noted for the data annotation apparatus 100 as described above, as well as elsewhere in the disclosure unless indicated otherwise.

The first machine learning dataset 1 and the second machine learning dataset 2 as described above in the data annotation apparatus and mentioned elsewhere in the disclosure are each referred to as a dataset upon which a machine learning model (i.e., machine learning algorithm) can be developed. The first data can be data from a whole set, or a subset, of the first machine learning dataset 1, and thus can be data from a training set, a validation set, or a testing set. The first data includes substantially a token (i.e. input token) in the first machine learning dataset 1 from which the at least one stimulus is generated, and can be a text (such as a specific text "can you get some help", a text in one language to be translated into another language), a photograph (i.e. image), a temperature, a sound, etc. There are no limitations herein.

The term "stimulus" as described above in the apparatus and mentioned elsewhere in the disclosure is referred to as a type of signal presented to an agent 8 (typically a human agent) that can elicit a sensory or behavioral response therein, and as such, the at least one stimulus generated by the stimulus generation portion 110 can include any, or a combination, of a visual stimulus/cue (e.g., a still image, a video, etc.), an auditory stimulus/cue (e.g., a sound), a haptic stimulus/cue (related to sense of touch and position, and including pressure, vibration, temperature, and tactile senses, etc.), an olfactory stimulus/cue (e.g., a smell), and a gustatory stimulus/cue (e.g., a taste), depending on different embodiments.

It is noted that these above sensory stimulus/cue examples serve only for an illustrating purpose, and therefore do not impose a limitation to the scope of the disclosure. Other stimuli/cues are also possible to serve as the at least one stimulus in the above mentioned data annotation apparatus and throughout the disclosure as well, as long as they can arouse a sensory or behavioral response in the agent.

The term "agent" as described above in the data annotation apparatus and mentioned elsewhere in the disclosure is referred to as an organism who generates a sensory or behavioral response upon being presented with a stimulus. Therefore, in the above mentioned data annotation apparatus and throughout the disclosure as well, the agent 8 can be a human agent, but can also be a non-human agent (i.e., an organism other than a human being). For example, a dog can be presented with olfactory stimuli or cues (i.e., smells) so as to generate a sensory or behavioral response based on the olfactory stimuli, and thus the dog can be the agent 8 in the above mentioned data annotation apparatus. Other organisms are also possible.

The term "response" as described above in the data annotation apparatus and mentioned elsewhere in the disclosure is referred to as a sensory or behavioral reaction to a stimulus, which can be measured or detected by the biometrics reading portion 120 in the data annotation apparatus 100. An analysis of the response to the stimulus can give rise to data of biological characteristics or features. The term "biometrics data" as described above in the data annotation apparatus and mentioned elsewhere in the disclosure can substantially be the data of biological characteristics, but may also include other data in addition to the data of biological characteristics.

Throughout the disclosure, unless indicated otherwise, the terms "annotate", "label", "classify" shall be interpreted as equivalent to labeling the data into one of several predefined meaningful categories.

It is noted that any of the at least one response detected by the biometrics reading portion 120 in the data annotation apparatus 100 can be an involuntary response or a voluntary response. The response can substantially include anything that can be measured from the agent that does not involve an explicit communication by the agent.

Specific examples of the at least one response as described above can include responses related to eye tracking activity, brain activity, electrodermal activity, body part motions, facial coding, body temperature, respiration, heart rate, pupil dilation, etc.

It is further noted that the biometrics data obtained from the biometrics reading portion 200 can serve as primary labeling data, or as secondary labeling data to argument the primary labeling data in the second machine learning dataset.

In view of the above, several embodiments of the data annotation apparatus are possible and are described in the following.

Figure 3:
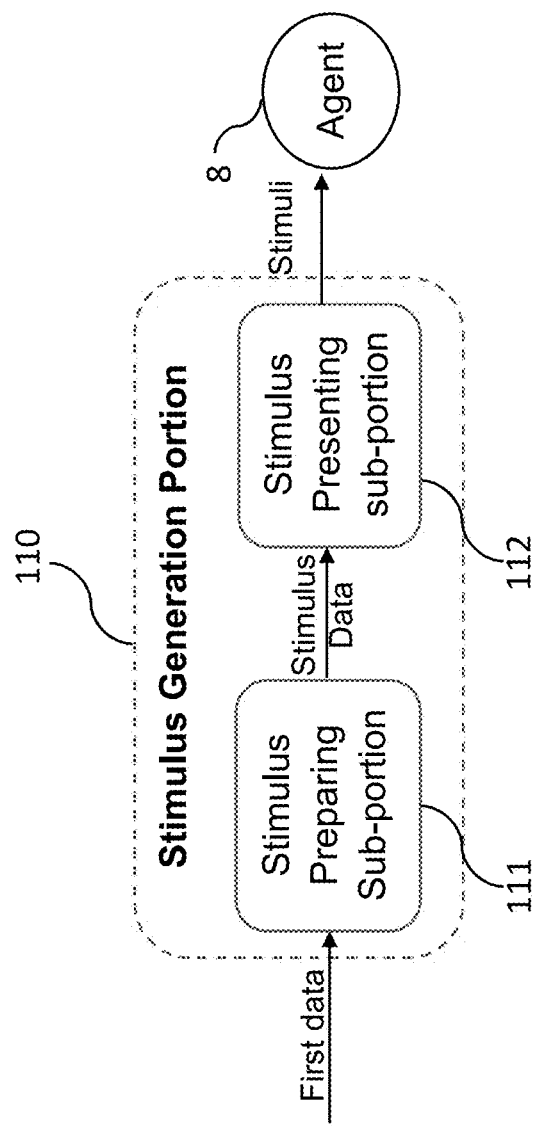
FIG. 3 shows a schematic structure of the stimulus generation portion 110 in the data annotation apparatus as shown in FIG. 2 according to some embodiments of the present disclosure.

According to some embodiments of the data annotation apparatus 100, the stimulus generation portion 110 includes a stimulus preparing sub-portion 111 and a stimulus presenting sub-portion 112, as illustrated in FIG. 3. The stimulus preparing sub-portion 111 is configured to process the first data from the first machine learning dataset 1 (not shown in FIG. 3) to thereby generate at least one stimulus data for presentation by the stimulus presenting sub-portion 112. The stimulus presenting sub-portion 112 is configured, based on the at least one stimulus data generated by the stimulus preparing sub-portion 111, to present to the agent 8 the at least one stimuli each corresponding to one of the at least one stimulus data.

Specifically, the stimulus preparing sub-portion 111 can comprise a processor and a memory, wherein the memory is configured to store a software program, and the processor is configured to perform a calculation based on the software program stored in the memory to thereby perform the task of processing the first data to thereby prepare the at least one stimulus data for presentation in the stimulus presenting sub-portion 112. The stimulus preparing sub-portion 111 can be a general computer having the software program, or can be a hardware computing device specifically designed for such a task. The computer and the hardware computing device can be locally arranged, or can be remotely arranged, such as on an intranet, an internet, or in a cloud.

It is noted that in some embodiments of the data annotation apparatus 100, the first data may itself include data that can be directly transferred to the stimulus presenting sub-portion 112 for presentation (i.e., the first data from the first machine learning dataset is substantially in a format of stimulus data that is ready for presentation by the stimulus presenting sub-portion 112), thereby negating the need to converted to the at least one stimulus data first. As such, in these embodiments of the data annotation apparatus 100, the stimulus preparing sub-portion 111 is unnecessary, and the stimulus generation portion 110 includes only the stimulus presenting sub-portion 112.

Herein the "stimulus data" is referred to as a type of data or instruction prepared by the stimulus preparing sub-portion 111 which, upon being delivered to the stimulus presenting sub-portion 112, can directly cause or instruct the stimulus presenting sub-portion 112 to present the stimulus corresponding to the stimulus data. For example, the stimulus preparing sub-portion 111 can generate one or more image files based on the first data from the first machine learning dataset 1, then the stimulus presenting sub-portion 112, after receiving the one or more image files from the stimulus preparing sub-portion 111, can directly present the corresponding images (i.e., visual stimuli) to the agent based on the image files.

Figure 4:
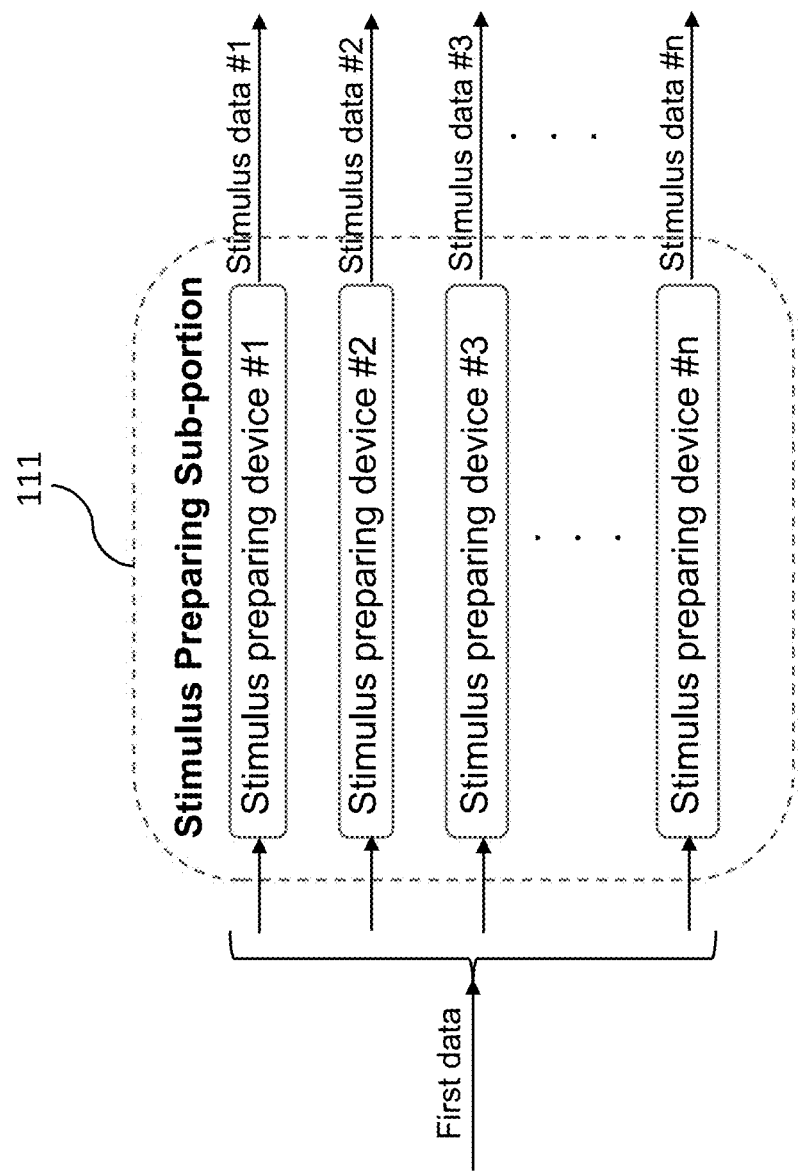
FIG. 4 shows a schematic structure of the stimulus preparing sub-portion 111 in the stimulus generation portion 110 as shown in FIG. 3 according to some embodiments of the present disclosure.

As mentioned above, the at least one stimulus generated by the stimulus generation portion 110 can include a variety of sensory cues. As such, according to some embodiments, the stimulus preparing sub-portion 111 comprises a plurality of stimulus preparing devices (illustrated by the stimulus preparing device #1, #2, . . . , #n in FIG. 4), each configured to generate a stimulus based on the first data from the first machine learning dataset 1 (illustrated by the stimulus #1,

2, . . . , #n in FIG. 4). It is also possible that the stimulus preparing sub-portion 111 includes only one stimulus preparing device, configured to only generate one stimulus based on the first data.

According to some embodiments, the stimulus presenting sub-portion 112 can include only one stimulus presenting device, which is configured to only present one stimulus to the agent 8 (not shown in the drawings). According to some other embodiments, the stimulus presenting sub-portion 112 can include more than one stimulus presenting device (illustrated by the stimulus presenting device #1, #2, . . . , #n in FIG. 5A), each configured to present one stimulus (illustrated by the stimulus #1, #2, . . . , #n in FIG. 5A) to the agent 8.

Figure 5A:
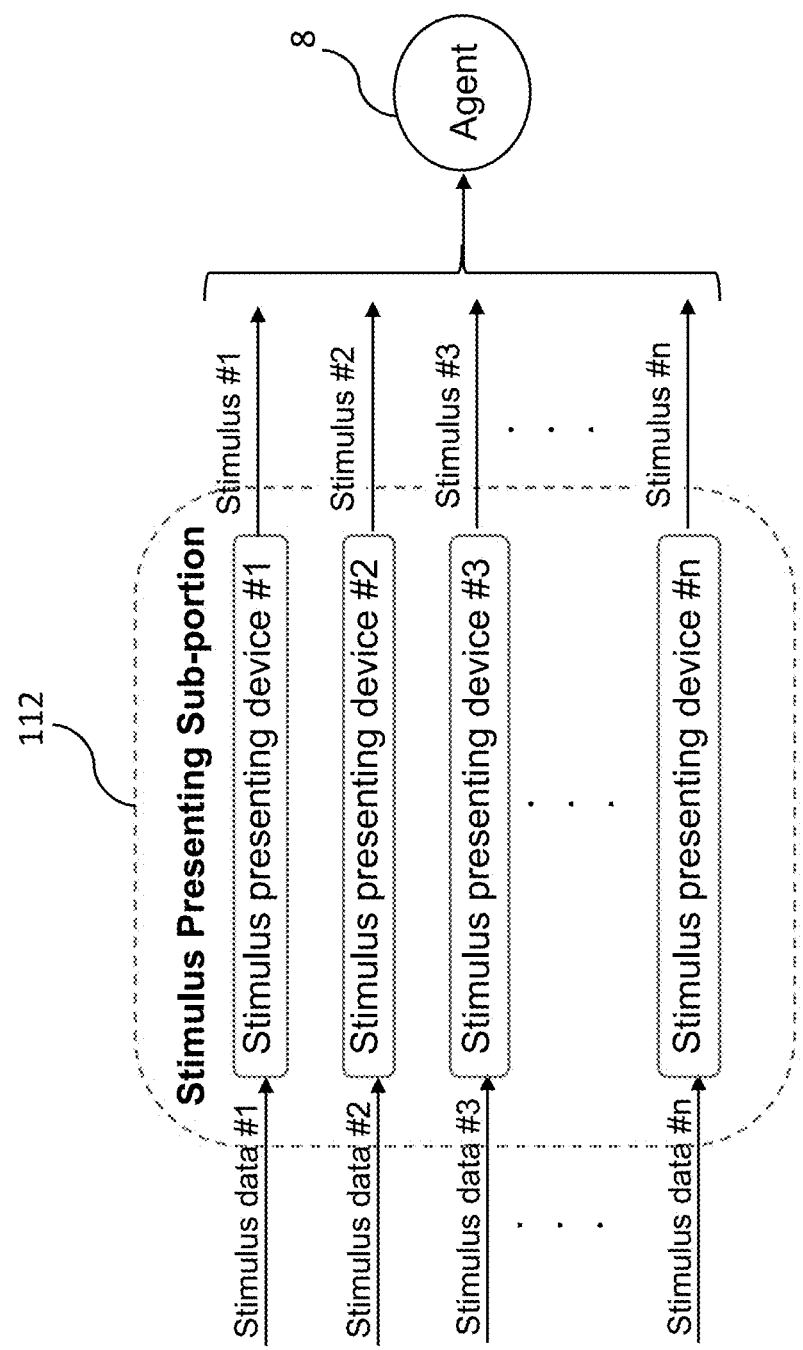
FIG. 5A shows a schematic structure of the stimulus presenting sub-portion 112 in the stimulus generation portion 110 as shown in FIG. 3 according to some embodiments of the present disclosure.

It is noted that one particular stimulus presenting device in the stimulus presenting sub-portion 112 as shown in FIG. 5A can be configured to present more than one stimulus (not shown in the figure). For example, the stimulus presenting device #1 as shown in FIG. 5A can both present stimulus #1 and stimulus #3 to the agent 8.

Figure 5B:
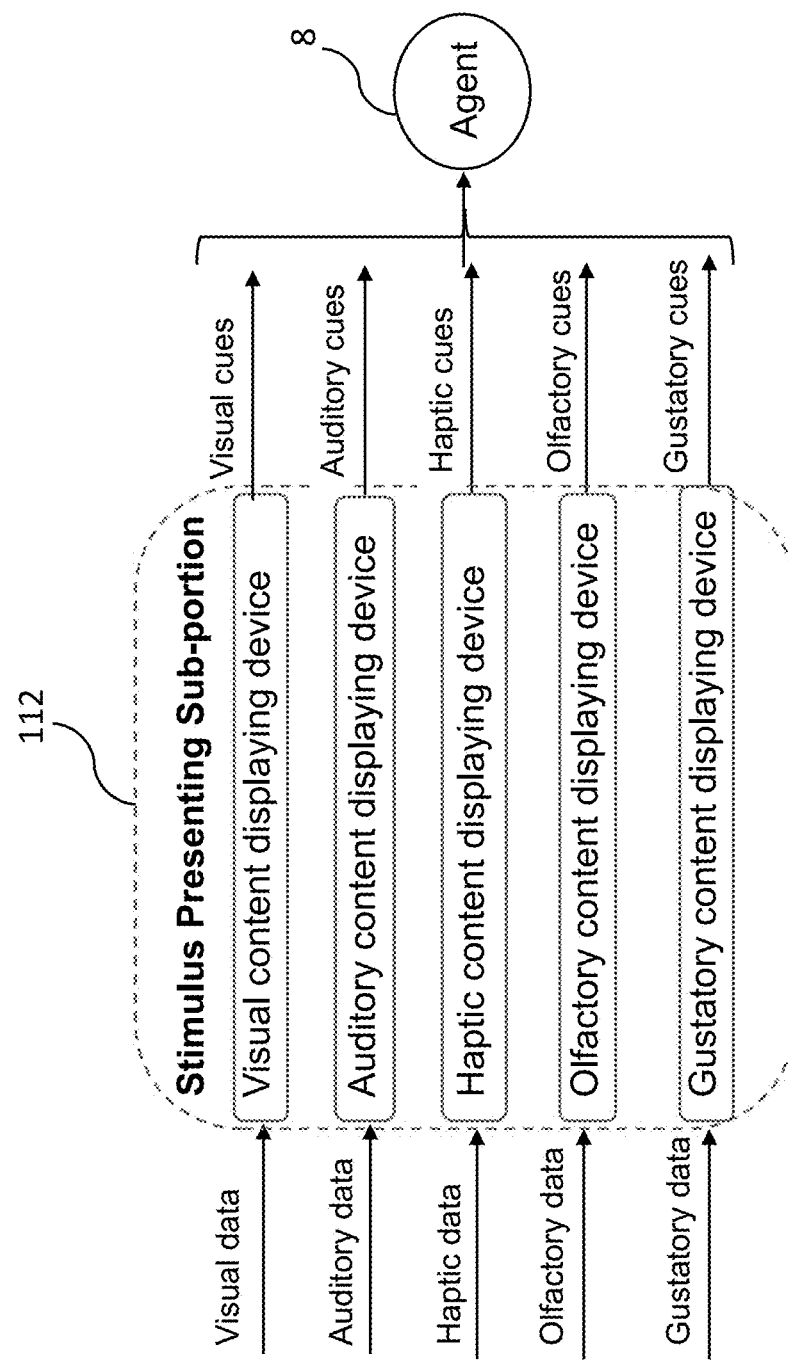
FIG. 5B illustrates one specific embodiment of the stimulus presenting sub-portion 112 as shown in FIG. 5A.

Herein the stimulus presenting sub-portion 112 can be a content-presenting device. Specifically, the stimulus presenting sub-portion 112 in the stimulus generation portion 110 can comprise at least one of a visual content displaying device, auditory content displaying device, a haptic content displaying device, an olfactory content displaying device, or a gustatory content displaying device, as illustrated in FIG. 5B.

For example, the content-presenting device can be a visual content displaying device, configured to display or present one or more visual cues (i.e. a type of stimulus data) in the form of still images or videos. As such, the above mentioned visual content displaying device can be a display panel allowing for direct display of images or videos, such as a TV, a tablet, a computer monitor, a smart phone, a virtual reality goggle, a smart watch, etc. The visual content displaying device can also be a projector or a movie theater playing device allowing for indirect display of images or videos by projecting onto a surface in front of the agent 8. The visual content displaying device can also be a actuator on a device or a machine, such as a robot, which visually displays to the agent 8 certain stimuli (such as position, velocity, etc.) to thereby generate visual stimuli/cues. There are no limitations herein.

In some cases, the visual content displaying device can be a printer or photo printer which can present to the agent 8 the visual cues in a form of pictures or photos. The visual content displaying device can also be a component of a device which has the functionality of displaying visual cues. There are no limitations to the specific visual content displaying device that can be employed herein.

The content-presenting device as mentioned above can be an auditory content displaying device, configured to present auditory cues (i.e. a stimulus data) to the agent 8. The auditory content displaying device can be a speaker, a headphone, earbuds, but can also other types of audio playing device, or can be a component of another device having the functionality of displaying auditory cues. There are no limitations herein.

The content-presenting device as mentioned above can be a haptic content displaying device, configured to present haptic cues (i.e. a stimulus data) related to senses of touch and position, which include pressure, vibration, temperature, and tactile senses, etc. Examples of a haptic cue displaying device can be a vibrator, a motor, but can also be other haptic devices, or can be a component of another device having the functionality of displaying haptic cues. There are no limitations herein.

Similarly, the content-presenting device as mentioned above can also be an olfactory content displaying device, configured to present a smell (i.e. olfactory cue, or a type of stimulus data) to the agent 8, or can be a gustatory content displaying device, configured to present a taste (i.e. gustatory cue, or a type of stimulus data) to the agent 8. Any of the olfactory content displaying device and the gustatory content displaying device can also be a component of another device having any of the two functionalities. There are no limitations herein.

It is noted that since these different stimulus presenting devices can present their respective stimuli to the agent 8 in parallel, they can be combined as one single stimulus presenting assembly for a combinatory presentation of multiple different stimuli. For example, if the stimulus data include both visual cues and auditory cues, they can be presented by a single computer system that includes a monitor and a speaker, or a single home theater system includes a projector and a speaker. The monitor and the projector can display visual contents based on the visual cues, and the speaker can display auditory contents based on the auditory cues.

Figure 6:
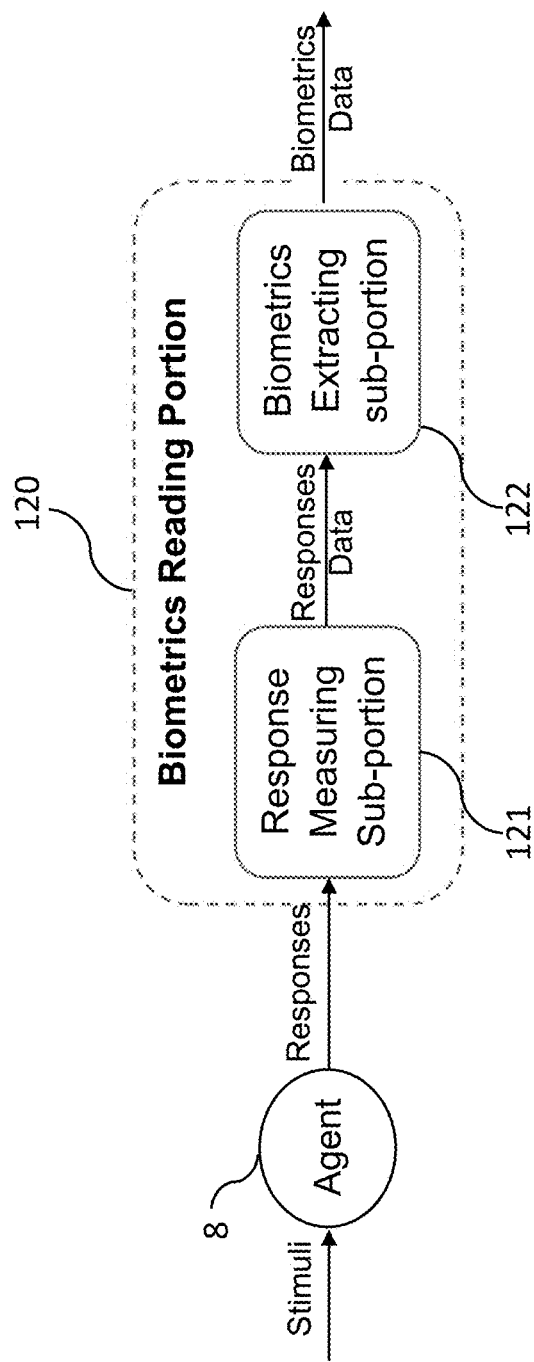
FIG. 6 shows a schematic structure of the biometrics reading portion 120 in the data annotation apparatus as shown in FIG. 2 according to some embodiments of the present disclosure.

In the data annotation apparatus 100 disclosed herein, the biometrics reading portion 120 can include a response measuring sub-portion 121 and a biometrics extracting sub-portion 122, as illustrated in FIG. 6.

The response measuring sub-portion 121 is configured to measure or detect the at least one response of the agent 8 (shown as "responses" in the figure) to the at least one stimulus (shown as "stimuli" in the figure), and then to send data of the responses (shown as "responses data" in the figure) to the biometrics extracting sub-portion 122. The biometrics extracting sub-portion 122 is configured to analyze the responses data that is transmitted from the response measuring sub-portion 121 to thereby obtain the biometrics data as shown in the figure (i.e., the biometrics extracting sub-portion 122 extracts the biometrics data from the responses data).

Figure 7:
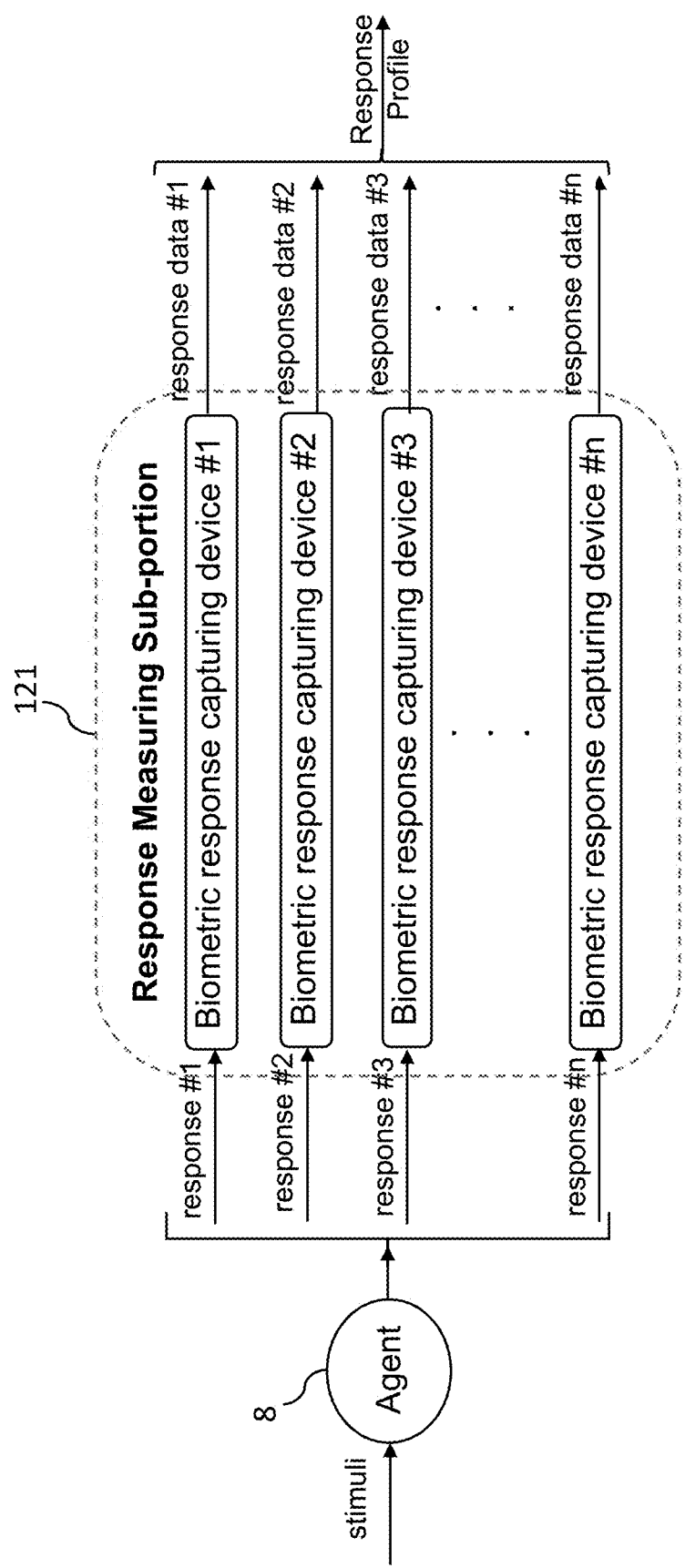
FIG. 7 shows a schematic structure of the response measuring sub-portion 121 in the biometrics reading portion 120 as shown in FIG. 6 according to some embodiments of the present disclosure.

According to some embodiments, the response measuring sub-portion 121 consists of a single biometric response-capturing device (not shown in the drawings). According to some other embodiments of the present disclosure, as illustrated in FIG. 7, the response measuring sub-portion 121 includes a plurality of biometric response capturing devices (illustrated by the biometric response capturing device #1, #2, . . . , #n in FIG. 7), each configured to measure one response (illustrated by the response #1, #2, . . . , #n in FIG. 7) of the agent 8 to the stimuli.

Herein depending on the types of responses of the agent 8 to be measured, the biometric response-capturing device as described above can have a variety of choices.

For example, the biometric response-capturing device can be a brain activity measuring device, which detects the brain activity of a user. Depending on the working mechanisms and/or detecting techniques, the brain activity measuring device that can be used as a biometric response-capturing device in the data annotation apparatus 100 includes electroencephalography (EEG), magnetoencephalography (MEG), functional magnetic resonance imaging (fMRI), single-photon emission computed tomography (SPECT), ligand-based positron emission tomography (PET), near infrared spectroscopy (NIRS), diffusion-tensor imaging (DTI), magnetic resonance spectroscopy (MRS), regional cerebral blood flow (rCBF), and transcranial magnetic stimulation (TMS), etc.

Most, if not all, of these above brain activity detecting devices can work in real-time, which allows for a real-time measurement of the brain activity of agent 8. It is noted that this above list of brain activity measuring devices shall not limit the scope of this present disclosure, and other devices having a similarly brain activity sensing functionality can also be employed as a biometric response-capturing device.

In addition, the biometric response-capturing device can be an eye tracking device (such as a virtual reality goggle or a video recording device) which detects a position and duration of focus of a user; a galvanic skin response (GSR) sensor which detects skin sweet level of a user, a temperature sensor which detects a body temperature of a user; an electrocardiogram (ECG) sensor which detects hear rates of a user; and a motion sensor which detects a motion of a user, etc. Other devices, such as those for detecting respiration rate, facial coding, pupil dilation, blood pressure, etc., can also be employed. Substantially any device that can measure anything from the agent that does not involve explicit communication by the agent, can be used. There are no limitations herein.

It is noted that these above mentioned biometric response-capturing devices can be utilized to work in parallel as a biometrics reading assembly in the response measuring sub-portion 121 to thereby realize a simultaneous detection of multiple responses of the agent 8 to the stimuli generated by the stimulus generation portion 110.

It is further noted that when multiple biometric response-capturing devices work in parallel as a biometrics reading assembly in the response measuring sub-portion 121, each biometric response-capturing device can generate a corresponding response data, as illustrated by FIG. 7. All of the response data respectively corresponding to the multiple biometric response-capturing devices can be combined to thereby generate a response profile of the agent 8, as illustrated in FIG. 7, which can then be sent to the biometrics extracting sub-portion 122 for data analysis.

The biometrics extracting sub-portion 122 is employed to extract the biometrics data from the responses data that is transmitted from the response measuring sub-portion 121. If multiple biometric response capturing devices are employed to result in a generation of the response profile of the agent 8, the biometrics extracting sub-portion 122 can process each response data included in the response profile to extract relevant biometric data corresponding thereto.

Specifically, the biometrics extracting sub-portion 122 can comprise a processor and a memory, wherein the memory is configured to store a software program, and the processor is configured to perform a calculation based on the software program stored in the memory to thereby perform the task of extracting the biometric data from the response data transmitted from the response measuring sub-portion 121. The biometrics extracting sub-portion 122 can be a general computer having the software program, or can be a hardware computing device specifically designed for such a task. The computer and the hardware computing device can be locally arranged, or can be remotely arranged, such as on an intranet, an internet, or in a cloud.

In the data annotation apparatus 100 as described above, the data integration portion 130 is configured to integrate the stimulus data from the stimulus generation portion 110, the biometrics data from the biometrics reading portion 120, and the training data from the first machine learning dataset 1 to thereby obtain the second machine learning dataset 2 for the subsequent training phase of machine learning utilizing the machine learning apparatus 200.

Specifically, the data integration portion 130 can comprise a processor and a memory, wherein the memory is configured to store a software program, and the processor is configured to perform a calculation based on the software program stored in the memory to thereby perform the task of integrating the stimulus data from the stimulus generation portion 110, the biometrics data from the biometrics reading portion 120, and the training data from the first machine learning dataset 1 to thereby obtain the second machine learning dataset 2. The data integration portion 130 can be a general computer having the software program, or can be a hardware computing device specifically designed for such a task. The computer and the hardware computing device can be locally arranged, or can be remotely arranged, such as on an intranet, an internet, or in a cloud.

Herein the data integration portion 130 substantially coordinates the at least one stimulus generated by the stimulus generation portion 110 with the biometric responses measured by the biometrics reading portion 120. Such a coordination allows for an accurate alignment among the stimulus data from the stimulus generation portion 110, the biometrics data from the biometrics reading portion 120, and the training data from the first machine learning dataset 1, and thus is key to making an enhanced machine learning dataset (i.e. the second machine learning dataset 2) useful.

Specifically, in order for an effective data integration, the data integration portion 130 can be configured to perform a series of sub-tasks including data synchronization, data preprocessing, and data annotation (i.e. data labeling), etc.

Data synchronization synchronizes the stimulus data and the biometrics data to establish a correlation or a corresponding relationship between these two sources of data. For any machine learning algorithm, in the training or testing data, it is always critical to know what "outputs" (i.e. the at least one response, measured by the biometrics reading portion 120) correspond to what "inputs" (the at least one stimulus produced by the stimulus generation portion 110), and thus in order to allow for an effective data synchronization for the data annotation apparatus 100, the stimulus generation portion 110 is configured to send a synchronization signal to the biometrics reading portion 120, as illustrated in FIG. 2.

It is noted that the synchronization signal substantially provides a communication channel that indicates to the biometrics reading portion 120 what stimuli were being generated at the time of the corresponding biometrics data. Thus it allows for accurate mapping of tokens in the first machine learning dataset 1 to the stimulus data generated by the stimulus generation portion 110 and to the biometrics data generated by the biometrics reading portion 120 so as to allow for the generation of the second machine learning dataset 2.

In the following, two specific embodiments are provided to further illustrate the data annotation apparatus as described above.

Figure 8:
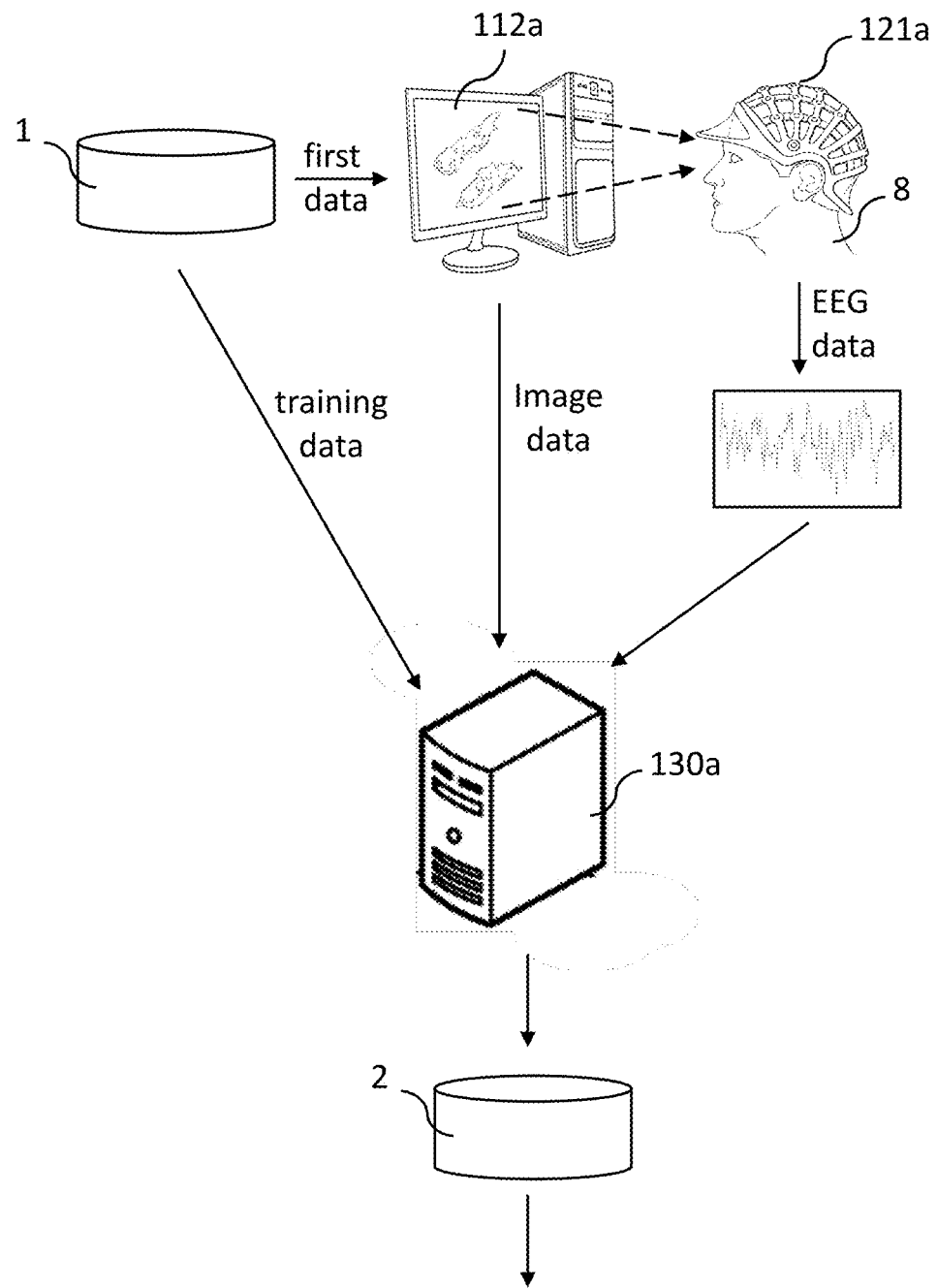
FIG. 8 illustrates an data annotation apparatus according to a first embodiment of the disclosure.

FIG. 8 illustrates an data annotation apparatus according to a first embodiment of the disclosure. As shown in the figure, this first embodiment of the data annotation apparatus 100 includes a computer monitor 112a and an electroencephalography (EEG) device 121a.

The computer monitor 112a is disposed in front of, and faces, the human agent 8, and is configured to provide visual stimuli (e.g., images/videos) to the human agent 8. The electroencephalography (EEG) device 121a is attached on to the top skin of the head of the human agent 8, and is configured to collect EEG signal from the human agent 8. As such, the computer monitor 112a and the electroencephalography (EEG) device 121a substantially constitute a stimulus presenting sub-portion 112 in the stimulus generation portion 110 as shown in FIG. 3 and a response measuring sub-portion 121 in the biometrics reading portion 120 as shown in FIG. 6, respectively.

In the first embodiment of the data annotation apparatus as shown in FIG. 8, in order to realize biometrics-enhanced machine learning, the computer monitor 112a first displays an image to the human agent 8 wearing the EEG device 121a. The image is based on the first data from the first machine learning dataset 1. Herein the image can be directly from the first data, or can be indirectly generated or prepared from the first data by means of a stimulus preparing sub-portion (not shown in the drawings).

While the human agent 8 is watching the image from the computer monitor 112a, the EEG device 121a actively and continuously measures the brain activity of the human agent 8 to thereby generate an EEG signal. Then the EEG signal, the image data (i.e., the stimuli data) based on which the computer monitor 112a presented the image to the human agent 8, and the training data from the first machine learning dataset 1, are all fed into a computer system 130a which serves as the data integration portion 130 as shown in FIG. 2.

The computer system 130a then performs a series of data processing including data synchronization, data processing, data labelling/annotation, and data integration to obtain the second machine learning database 2, which can subsequently be used for a machine learning apparatus 200 as illustrated in FIG. 1 and FIG. 2 for machine learning.

Figure 9:
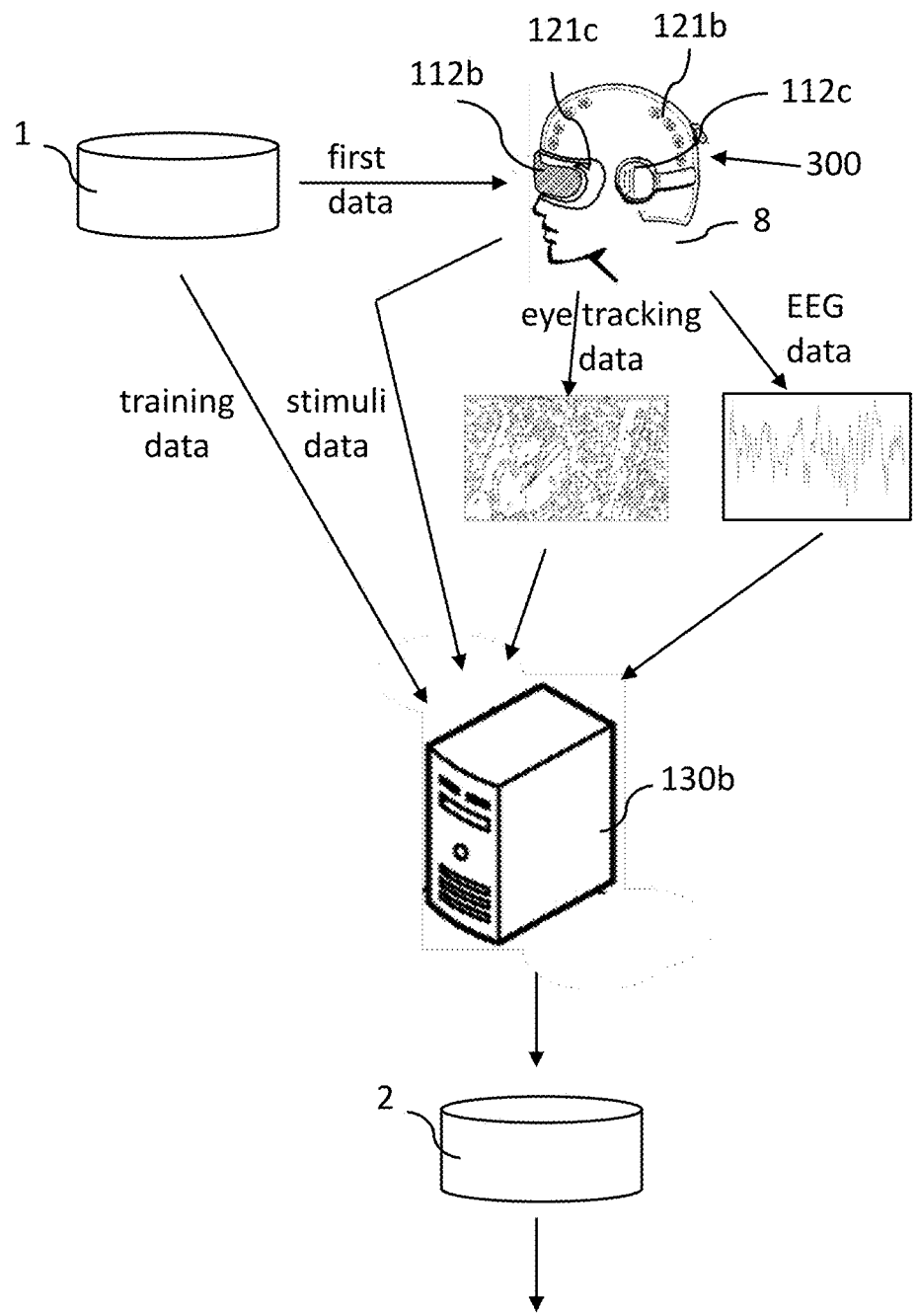
FIG. 9 illustrates an data annotation apparatus according to a second embodiment of the disclosure.

FIG. 9 illustrates an data annotation apparatus according to a second embodiment of the disclosure. As shown in the figure, this second embodiment of the data annotation apparatus 100 includes a headset assembly 300, which is worn by a human agent 8.

The headset assembly 300 contains a display panel 112b, mounted on a goggle covering the eyes of the human agent 8, which is configured to provide images/videos to the human agent 8. The headset assembly 300 further contains a headphone 112c, arranged to cover the ears of the human agent 8, which is configured to provide sounds/audios to the human agent 8. Each of the display panel 112b and the headphone 112c substantially constitutes a stimulus presenting device in the stimulus presenting sub-portion 112 as shown in FIG. 5A.

Herein the images/videos displayed by the display panel 112b and the sounds/audios presented by the headphone 112c are essentially the visual stimuli (i.e. visual cues) and the auditory stimuli (i.e. auditory cues) that are directly from, or indirectly prepared by a stimulus preparing sub-portion (not shown in the figure) from, the first data from the first machine learning dataset 1. The stimulus preparing sub-portion can be a software program or a hardware computing device.

The headset assembly 300 further contains an EEG device 121b disposed onto an inner side of the headset assembly 300 so as to allow an attachment thereof to the top skin of the head of the human agent 8 when it is worn by the human agent 8. The EEG device 121b is configured to measure the EEG signal of the human agent 8 while the human agent 8 is watching a visual content via the display panel of the goggle 112b and/or is listening to an auditory content via the headphone 112c.

The headset 300 further contains an eye tracking device 121c mounted onto the goggle and facing one or two of the eyes of the human agent 8. The eye tracking device 121c is configured to collect eye tracking data (i.e. motions of eyeballs, including focus position and duration) of the human agent 8 while the human agent 8 is watching a visual content via the display panel of the goggle 112b and/or is listening to an auditory content via the headphone 112c.

Herein in this second embodiment of the data annotation apparatus 100 as described above, each of the EEG device 121b and the eye tracking device 121c in the headset assembly 300 substantially constitutes a biometrics response capturing device in the response measuring sub-portion 121 in the biometrics reading portion 120 as illustrated in FIG. 7.

In this second embodiment of the data annotation apparatus as shown in FIG. 9, in order to realize biometrics-enhanced machine learning, the human agent 8 first needs to wear the headset assembly 300, with the goggle-mounted display panel 112b displaying images/videos and the headphone 112c presenting sounds/audios to the human agent 8.

While the human agent 8 is exposing himself/herself to the visual and auditory stimuli presented by the display panel 112b and the headphone 112c, the EEG device 121b actively and continuously measures the brain activity of the human agent 8 to thereby obtain an EEG data of the human agent 8, and simultaneously the eye tracking device 121c actively and continuously detects motions of the eyeballs of the human agent 8 to thereby obtain an eye tracking data of the human agent 8.

Then the biometrics data (including the EEG data and the eye tracking data), the stimuli data (including the visual stimuli data and the auditory stimuli data based on which the display panel 112b and the headphone 112c respectively presented to the human agent 8), and the training data from the first machine learning dataset 1, are all fed into a computer system 130b which serves as the data integration portion 130 as shown in FIG. 2.

The data integration portion 130b then performs a series of data processing including data synchronization, data processing, data labelling/annotation, and data integration to obtain the second machine learning database 2, which can subsequently be used for a machine learning apparatus 200 as illustrated in FIG. 1 and FIG. 2 for machine learning.

In addition to the two embodiments of the data annotation apparatus as described above, there are more examples of the data annotation apparatus. Some of the examples are listed in the following table (Table 1).

TABLE 1

Embodiments of the data annotation apparatus for enhanced machine learning.

| First Machine Learning Dataset | | Stimulus Generation | Biometrics Reading | Biometrics |
|---|---|---|---|---|
| Input Token | Ground Truth | Portion 110 | Portion 120 | Data |
| Text: "can you get some help?" | Action: Call 911 | Realize the text in emotion-appropriate audio with text-to-speech | Measure stress level using relevant biometric features | Stress level: high |

TABLE 1-continued

Embodiments of the data annotation apparatus for enhanced machine learning.

| First Machine Learning Dataset | | Stimulus Generation | Biometrics Reading | Biometrics |
|---|---|---|---|---|
| Input Token | Ground Truth | Portion 110 | Portion 120 | Data |
| Photo-graph | Identity of person in photo | Show the agent photographs | Measure pupil dilation, pulse rate, etc. that correlate with Agent knowing person or having particular relationship with person | Pupil dilation: X Pulse rate: Y |
| Text | Truth of statement | Asking agent questions about statement: Automatic NLP module that crafts appropriate questions to ask, and emotion-appropriate TTS to ask the questions in suggestive ways. | Biometric data (e.g., pulse rate, skin resistance) that correlate with Agent making false statements: similar biometrics used for polygraphs. | ERP EEG Eye tracking Voice analysis Facial expression |
| Text in language A | Text in language B | Play translation of language A text to language B | Measure non-verbal behavior (facial expressions, gesture, etc.) that correlate with either confusion (bad translation) or agreeability (good translation) | Facial expressions Gesture |
| Temperature of room | Level of comfort | Adjust temperature of room | Measure biometrics that correlate with temperature comfort: sweat, body language | Whole body pose Correlate of sweat |
| Text to speech rendition | Mean opinion score (MOS): Users ranking quality of TTS on a 1-5 scale, the standard measure of TTS quality | Play text-to-speech rendition to Agent | Facial expression Body language | Facial expression Body language |

In one example where the input token is a text "can you get some help?", the stimulus generation portion 110 can realize the text in emotion-appropriate audio with text-to-speech, and the biometrics reading portion 110 is employed to measure a stress level, and as such, the stress level is added in the second machine learning dataset as a feature which could improve classifying this text as emergent, and likely needing immediate assistance.

In another example where a photograph of a person is displayed to the agent 8, biometric data (such as pupil dilation, pulse rate, etc.) can be measured by the biometrics reading portion 120 to correlate with the agent 8 knowing, or having particular relationship with, the person. As such, the enhanced second machine learning dataset having these additional biometric features can indicate the relationship of the person in the photograph to the agent 8, and thus can improve classification.

In any of the embodiments of the machine learning data annotation apparatus as described above, the machine learning data annotation apparatus can, by means of the stimulus generation portion, generate stimuli and present the stimuli to an agent based on the first data from the first machine learning dataset. Next by means of the biometrics reading portion, the machine learning data annotation apparatus can detect responses of the agent to the stimuli and then extract biometrics data based on the responses of the agent. Then by means of the data integration portion, the machine learning data annotation apparatus can integrate the stimulus data (i.e., the data of the stimuli), the biometrics data, and the training data from the first machine learning dataset to thereby obtain a second machine learning dataset, which can subsequently be used for machine learning.

Compared with the first machine learning dataset, the second machine learning dataset contains an additional biometrics data collected from the human agent with a task of data labeling/annotation. This additional biometrics data can be leveraged for an improved task of data labeling.

On the one hand, if the biometrics data serves a primary labelling purpose, because data labeling can be realized by directly correlating with features in the biometrics data without conscious involvement of the human agent, the potential issue of human errors can be avoided, leading to a more reliable data annotation than the traditionally manual approach. Also since this whole process of biometrics-mediated data labeling can substantially be carried out automatically, a great amount of time can thus be saved, resulting in an increased efficiency and a long-term saving of cost.

On the other hand, if the biometrics data serves a secondary labelling purpose in addition to the labeling data which has been manually performed by the human agent, also because of the above mentioned advantages of biometrics-mediated data labeling, the data labeled via biometrics can be used to complement or cross-validate the data manually labelled. As such, the accuracy of labelled/annotated data can be improved.

Therefore, regardless of whether the biometrics data serves a primary or secondary labelling purpose, the biometrics data can result in an improved task of data labeling, leading to a generation of a more enhanced machine learning dataset (i.e. the second machine learning dataset) than the original machine learning dataset (i.e. the first machine learning dataset), which in turn can result in an improved machine learning.

It should be further noted that in addition to generating as much volume of training data as possible for a better machine learning performance due to the improved data labelling, the machine learning data annotation apparatus as described above can be further utilized to find additional features that may not have been suggested by explicit voluntary annotation. With these additional new features, it is possible to make the machine learning perform even better.

Taken together, the machine learning data annotation apparatus as described above can result in an enhanced machine learning dataset for an improved machine learning.

In a second aspect, the present disclosure further provides a machine learning assembly. The machine learning assembly includes a data annotation apparatus according to any of the embodiments as described above, and further includes a machine learning apparatus.

FIG. 1 also illustrates a machine learning assembly 900 according to some embodiments of the present disclosure. In these embodiments of the machine learning assembly 900, the data annotation apparatus 100 is configured to generate, and present to an agent 8, at least one stimulus based on a first data from a first machine learning dataset; the data annotation apparatus 100 is next configured to collect at least one response from the agent and to extract biometrics data based on the at least one response from the agent; and the data annotation apparatus 100 is then configured to integrate the stimulus data, the biometrics data, and the training data from the first machine learning dataset 1 to thereby obtain a second machine learning dataset 2.

The machine learning apparatus 200 is configured to input data from the second machine learning dataset 2 and to develop a machine learning model based on the second machine learning dataset 2. The machine learning model can be a linear regression model, a logistic regression model, and an artificial neural network-based model.

Herein the term "model" can be interchangeable with "algorithm".

Specifically, the machine learning apparatus 200 can comprise a processor and a memory, wherein the memory is configured to store a software program, and the processor is configured to perform a calculation based on the software program stored I the memory to thereby perform the task of inputting data from the second machine learning dataset 2 and developing a machine learning model based on the second machine learning dataset 2. The machine learning apparatus 200 can be a general computer having the software program, or can be a hardware computing device specifically designed for such a task. The computer and the hardware computing device can be locally arranged, or can be remotely arranged, such as on an intranet, an internet, or in a cloud.

Because the machine learning assembly disclosed herein includes a data annotation apparatus as described above, the machine learning assembly shall have the same advantages as have been described for the data annotation apparatus. Detailed description of these advantages in the machine learning assembly is skipped herein.

In a third aspect, the present disclosure further provides a method for enhanced machine learning, which utilizes the data annotation apparatus as described above.

Figure 10:
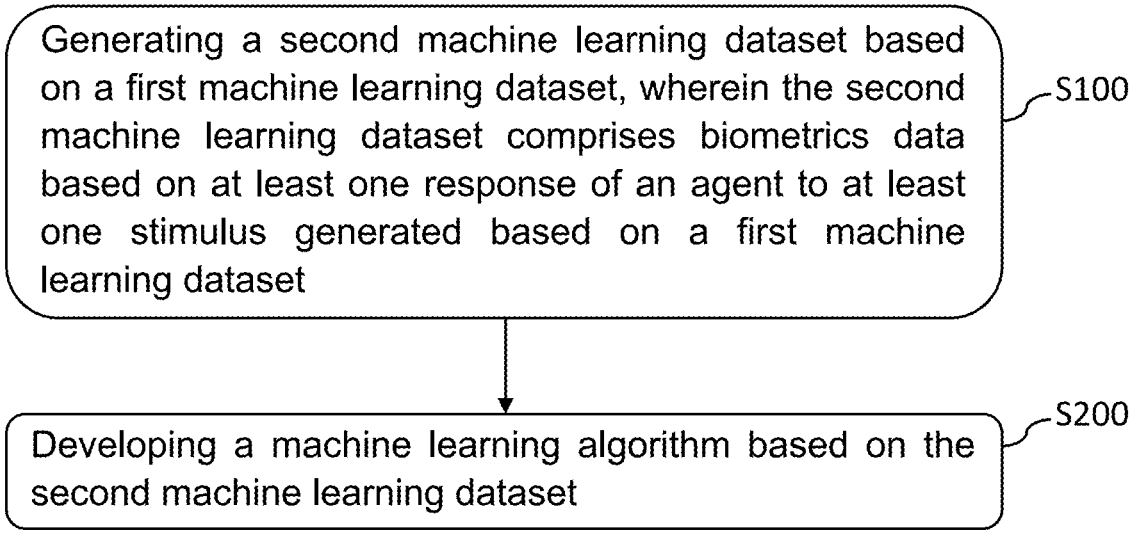
FIG. 10 is a flow chart of a method for enhanced machine learning according to some embodiments of the disclosure.

As illustrated in FIG. 10, the method for enhanced machine learning comprises the following steps:

S100: generating a second machine learning dataset based on a first machine learning dataset, wherein the second machine learning dataset comprises biometrics data based on at least one response of an agent to at least one stimulus generated based on a first machine learning dataset; and S200: developing a machine learning algorithm based on the second machine learning dataset.

Specifically, the steps S100 and S200 can be carried out by means of the data annotation apparatus 100 and the machine learning apparatus 200, respectively, as described above and illustrated in FIG. 1.

In the method as described above, the at least one stimulus can include one, or a combination of a visual stimulus, an auditory stimulus, a haptic stimulus, an olfactory stimulus, and a gustatory stimulus. According to some preferred embodiments of the method, the at least one stimulus comprises at least one of a visual stimulus, an auditory stimulus, or a haptic stimulus.

In the method as described above, the biometrics data can include at least one of electroencephalography (EEG) data, magnetoencephalography (MEG) data, functional magnetic resonance imaging (fMRI) data, single-photon emission computed tomography (SPECT) data, ligand-based positron emission tomography (PET) data, near infrared spectroscopy (NIRS) data, diffusion-tensor imaging (DTI) data, magnetic resonance spectroscopy (MRS) data, regional cerebral blood flow (rCBF) data, transcranial magnetic stimulation (TMS) data, eye tracking data skin sweet level data, temperature data; electrocardiogram (ECG) data; motion data, respiration rate data, facial coding data, pupil dilation data, and blood pressure data.

According to some preferred embodiments of the method, the biometrics data comprises at least one of the electroencephalography (EEG) data and the eye tracking data.

Figure 11:
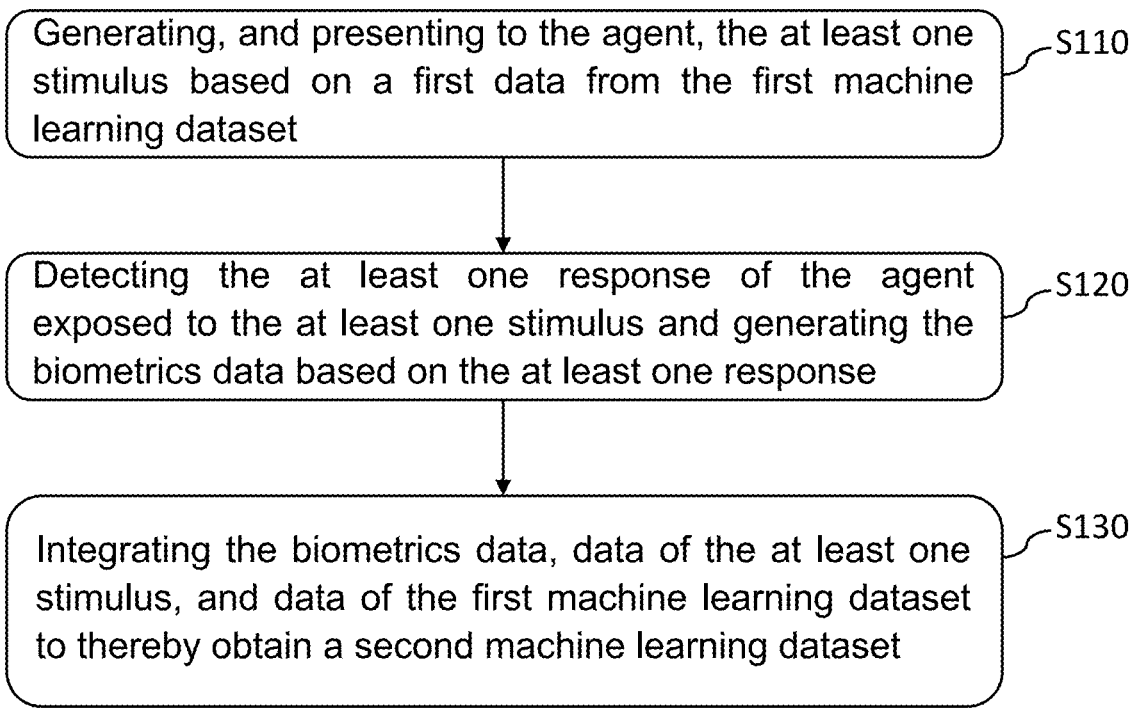
FIG. 11 is a flow chart of carrying the step S100 in the method for enhanced machine learning shown in FIG. 10 according to some embodiments of the disclosure.

According to some embodiments of the disclosure, the step S100 can include the following sub-steps, as illustrated in FIG. 11:

S110: generating, and presenting to the agent, the at least one stimulus based on a first data from the first machine learning dataset;

S120: detecting the at least one response of the agent exposed to the at least one stimulus and generating the biometrics data based on the at least one response;

S130: integrating the biometrics data, data of the at least one stimulus, and data of the first machine learning dataset to thereby obtain a second machine learning dataset.

Specifically, the steps S110, S120, and S130 can be carried out by means of the stimulus generation portion 110, the biometrics reading portion 120, and the data integration portion 130 of the data annotation apparatus 100, respectively, as described above and illustrated in FIG. 2.

Figure 12:
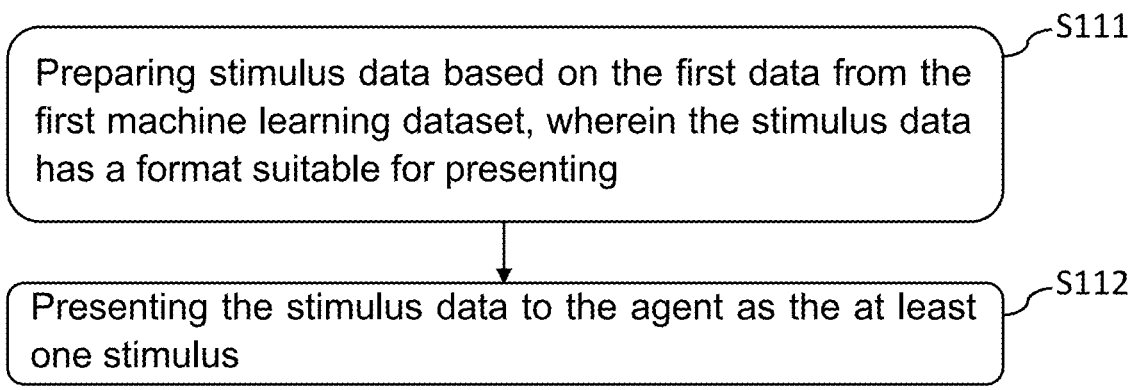
FIG. 12 is a flow chart of carrying the sub-step S110 in the step S100 shown in FIG. 11 according to some embodiments of the disclosure.

According to some embodiments of the disclosure, the step S110 can include the following sub-steps, as illustrated in FIG. 12:

S111: preparing stimulus data based on the first data from the first machine learning dataset, wherein the stimulus data has a format suitable for presenting; and S112: presenting the stimulus data to the agent as the at least one stimulus.

Specifically, the steps S111 and S112 can be carried out by means of the stimulus preparing sub-portion 111 and the stimulus presenting sub-portion 112 of the stimulus generation portion 110 in the data annotation apparatus 100, respectively, as described above and illustrated in FIG. 3.

Figure 13:
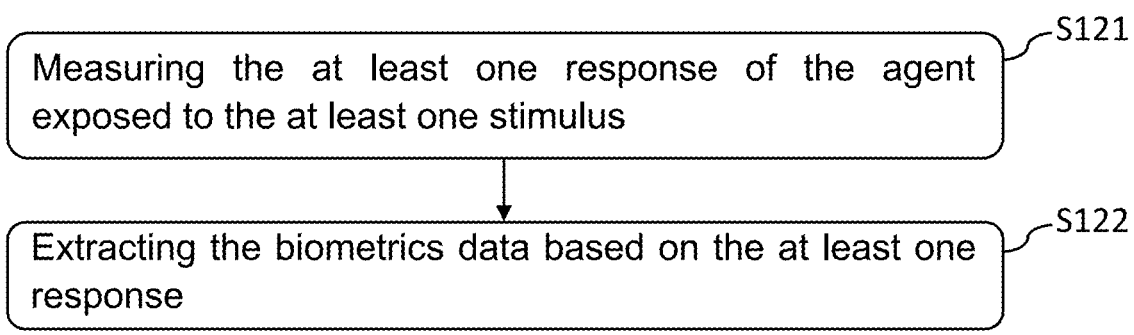
FIG. 13 is a flow chart of carrying the sub-step S120 in the step S100 shown in FIG. 11 according to some embodiments of the disclosure.

According to some embodiments of the disclosure, the step S120 can include the following sub-steps, as illustrated in FIG. 13:

S121: measuring the at least one response of the agent exposed to the at least one stimulus; and S122: extracting the biometrics data based on the at least one response.

Specifically, the steps S121 and S122 can be carried out by means of the response measuring sub-portion 121 and the biometrics extracting sub-portion 122 of the biometrics reading portion 120 in the data annotation apparatus 100, respectively, as described above and illustrated in FIG. 6.

Because the method for enhanced machine learning disclosed herein substantially utilizes the data annotation apparatus and the machine learning assembly as described above, the method shall have the same advantages as has been described for the data annotation apparatus and the machine learning assembly. Detailed description of these advantages in the method is thus skipped herein.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A data annotation apparatus for machine learning, comprising: a memory, an interface and a processor, wherein the memory and a communication interface are coupled to the processor, wherein the memory is configured to store computer executable instructions, wherein the interface is configured for data transmission of a device and an external device, and wherein the processor is configured to execute the computer executable instructions to control the execution of a method for generating a second machine learning dataset based on a first machine learning dataset comprising:
generating and presenting to an agent at least one stimulus based on a first data from a first machine learning dataset;
measuring at least one response of the agent to the at least one stimulus, and generating biometrics data based on the at least one response; and
integrating the biometrics data, data of the at least one stimulus, and data of the first machine learning dataset to thereby obtain a second machine learning dataset.

2. The data annotation apparatus of claim 1, wherein the processor is further configured to execute the computer executable instructions to implement the following steps:
presenting to the agent the at least one stimulus based on the first data from the first machine learning dataset.

3. The data annotation apparatus of claim 2, wherein the processor is further configured to execute the computer executable instructions to implement the following steps:
configuring to process the first data from the first machine learning dataset to thereby generate at least one stimulus data suitable for presentation; and
based on the at least one stimulus data, presenting to the agent the at least one stimulus, wherein each of the at least one stimulus corresponds to one of the at least one stimulus data.

4. The data annotation apparatus of claim 2, wherein the at least one stimulus comprises one, or a combination, of a visual stimulus, an auditory stimulus, a haptic stimulus, an olfactory stimulus, and a gustatory stimulus, wherein:
a visual content displaying device is configured to present the visual stimulus;
an auditory content displaying device is configured to present the auditory stimulus;
a haptic content displaying device is configured to present the haptic stimulus;
an olfactory content displaying device is configured to present the olfactory stimulus; and
a gustatory content displaying device is configured to present the gustatory stimulus.

5. The data annotation apparatus of claim 1, wherein the processor is further configured to execute the computer executable instructions to implement the following steps:
measuring the at least one response of the agent to the at least one stimulus; and
extracting the biometrics data based on the data of the at least one response.

6. The data annotation apparatus of claim 1, wherein the first data is from at least one of a training set, a validation set, or a testing set, of the first machine learning dataset.

7. A machine learning assembly, comprising a data annotation apparatus according to claim 1.

8. The data annotation apparatus of claim 4, wherein the at least one stimulus comprises at least one of a visual stimulus, an auditory stimulus, or a haptic stimulus.

9. The data annotation apparatus of claim 1, wherein the biometrics data comprises at least one of electroencephalography (EEG) data, magnetoencephalography (MEG) data, functional magnetic resonance imaging (fMRI) data, single-photon emission computed tomography (SPECT) data, ligand-based positron emission tomography (PET) data, near infrared spectroscopy (NIRS) data, diffusion-tensor imaging (DTI) data, magnetic resonance spectroscopy (MRS) data, regional cerebral blood flow (rCBF) data, transcranial magnetic stimulation (TMS) data, eye tracking data, skin sweet level data, temperature data, electrocardiogram (ECG) data, motion data, respiration rate data, facial coding data, pupil dilation data, or blood pressure data.

10. A method for machine learning, comprising:
generating a second machine learning dataset based on a first machine learning dataset, wherein the second machine learning dataset comprises biometrics data based on at least one response of an agent to at least one stimulus generated based on a first machine learning dataset; and
developing a machine learning algorithm based on the second machine learning dataset;
wherein generating a second machine learning dataset based on a first machine learning dataset comprises:
generating, and presenting to the agent, the at least one stimulus based on a first data from the first machine learning dataset;
detecting the at least one response of the agent exposed to the at least one stimulus and generating the biometrics data based on the at least one response; and integrating the biometrics data, data of the at least one stimulus, and data of the first machine learning dataset to thereby obtain a second machine learning dataset.

11. The method of claim 10, wherein the generating, and presenting to the agent, the at least one stimulus based on a first data from the first machine learning dataset comprises:
preparing stimulus data based on the first data from the first machine learning dataset, wherein the stimulus data has a format suitable for presenting; and
presenting the stimulus data as the at least one stimulus.

12. The method of claim 10, wherein the detecting the at least one response of the agent exposed to the at least one stimulus and generating the biometrics data based on the at least one response comprises:
measuring the at least one response of the agent exposed to the at least one stimulus; and
extracting the biometrics data based on the at least one response.

13. The method of claim 10, wherein the at least one stimulus comprises one, or a combination, of a visual stimulus, an auditory stimulus, a haptic stimulus, an olfactory stimulus, and a gustatory stimulus.

14. The method of claim 13, wherein the at least one stimulus comprises at least one of a visual stimulus, an auditory stimulus, or a haptic stimulus.

15. The method of claim 10, wherein the biometrics data comprises at least one of electroencephalography (EEG) data, magnetoencephalography (MEG) data, functional magnetic resonance imaging (fMRI) data, single-photon emission computed tomography (SPECT) data, ligand-based positron emission tomography (PET) data, near infrared spectroscopy (NIRS) data, diffusion-tensor imaging (DTI) data, magnetic resonance spectroscopy (MRS) data, regional cerebral blood flow (rCBF) data, transcranial magnetic stimulation (TMS) data, eye tracking data, skin sweet level data, temperature data, electrocardiogram (ECG) data, motion data, respiration rate data, facial coding data, pupil dilation data, or blood pressure data.

* * * * *